United States Patent
Williams

(10) Patent No.: US 12,525,811 B1
(45) Date of Patent: Jan. 13, 2026

(54) CONTAINER FOR CHARGING ELECTRONIC DEVICES

(71) Applicant: Eldred Williams, Riverview, FL (US)

(72) Inventor: Eldred Williams, Riverview, FL (US)

(*) Notice: Subject to any disclaimer, the term of this patent is extended or adjusted under 35 U.S.C. 154(b) by 0 days.

(21) Appl. No.: 18/829,376

(22) Filed: Sep. 10, 2024

(51) Int. Cl.
| | |
|---|---|
| *A45C 13/10* | (2006.01) |
| *A45C 3/02* | (2006.01) |
| *A45C 15/00* | (2006.01) |
| *A61H 37/00* | (2006.01) |
| *A61L 2/10* | (2006.01) |
| *B65D 43/16* | (2006.01) |
| *B65D 55/14* | (2006.01) |
| *G06V 40/13* | (2022.01) |
| *H02J 7/00* | (2006.01) |
| *H02J 7/04* | (2006.01) |
| *H02J 50/10* | (2016.01) |

(52) U.S. Cl.
CPC ............ *H02J 7/0044* (2013.01); *A61H 37/00* (2013.01); *B65D 43/166* (2013.01); *B65D 55/14* (2013.01); *G06V 40/13* (2022.01); *H02J 7/0013* (2013.01); *H02J 7/04* (2013.01)

(58) Field of Classification Search
CPC .......... H02J 7/0044; H02J 7/0013; H02J 7/04; H02J 50/10; H02J 7/00; A61H 37/00; B65D 43/166; B65D 55/14; G06V 40/13; A45C 13/10; A45C 15/00; A45C 3/02; A61L 2/10
USPC .......................................................... 307/42
See application file for complete search history.

(56) References Cited

U.S. PATENT DOCUMENTS

| | | |
|---|---|---|
| 6,844,494 B1 | 1/2005 | Nevins |
| 8,950,224 B2 | 2/2015 | Spencer |
| 8,952,780 B2 | 2/2015 | Simpson |
| D812,934 S | 3/2018 | Leonorovitz |
| 2008/0170355 A1 | 7/2008 | Kyriakides |
| 2010/0231161 A1 | 9/2010 | Brown |
| 2023/0189953 A1 | 6/2023 | Dugoni |
| 2023/0307931 A1* | 9/2023 | King ................. H02J 7/0045 |

FOREIGN PATENT DOCUMENTS

| | | | |
|---|---|---|---|
| CN | 210092945 | * | 2/2020 |
| WO | 2023121881 | | 6/2023 |

* cited by examiner

*Primary Examiner* — Rexford N Barnie
*Assistant Examiner* — Xuan Ly

(57) ABSTRACT

The container for charging electronic devices is a storage device. The container for charging electronic devices is configured for use with one or more personal tools. The container for charging electronic devices forms a protected space that contains the one or more personal tools. The container for charging electronic devices incorporates a containment structure and a control circuit. The control circuit attaches to the containment structure. The containment space forms the protected space. The control circuit is an electric circuit. The control circuit illuminates the protected space. The control circuit further provides a locking structure that locks the containment structure in the closed position. The control circuit further provides a source of electric energy used for recharging the batteries of the one or more personal tools while the one or more personal tools are stored in the protected space.

12 Claims, 5 Drawing Sheets

CONTAINER FOR CHARGING ELECTRONIC DEVICES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Not Applicable

SUMMARY OF INVENTION

The container for charging electronic devices is a storage device. The container for charging electronic devices is configured for use with one or more personal tools. The container for charging electronic devices forms a protected space that contains the one or more personal tools. The container for charging electronic devices comprises a containment structure and a control circuit. The control circuit attaches to the containment structure. The containment space forms the protected space. The control circuit is an electric circuit. The control circuit illuminates the protected space. The control circuit further provides a locking structure that locks the containment structure in the closed position. The control circuit further provides a source of electric energy used for recharging the batteries of the one or more personal tools while the one or more personal tools are stored in the protected space.

These together with additional objects, features and advantages of the container for charging electronic devices will be readily apparent to those of ordinary skill in the art upon reading the following detailed description of the presently preferred, but nonetheless illustrative, embodiments when taken in conjunction with the accompanying drawings.

In this respect, before explaining the current embodiments of the container for charging electronic devices in detail, it is to be understood that the container for charging electronic devices is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the container for charging electronic devices.

It is therefore important that the claims be regarded as including such equivalent construction insofar as they do not depart from the spirit and scope of the container for charging electronic devices. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
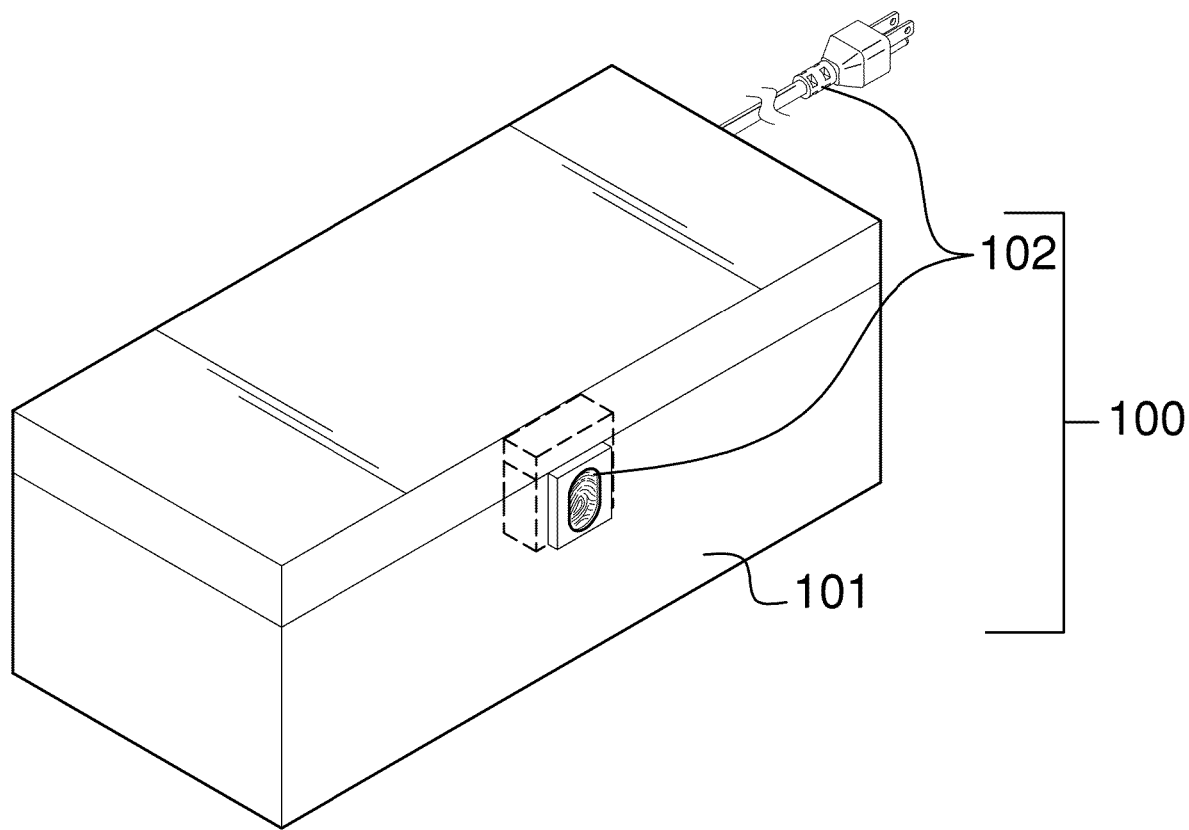
FIG. 1 is a perspective view of an embodiment of the disclosure.
Figure 1:
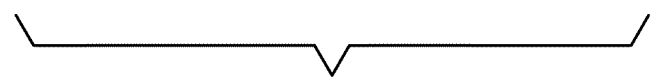
Figure 2:
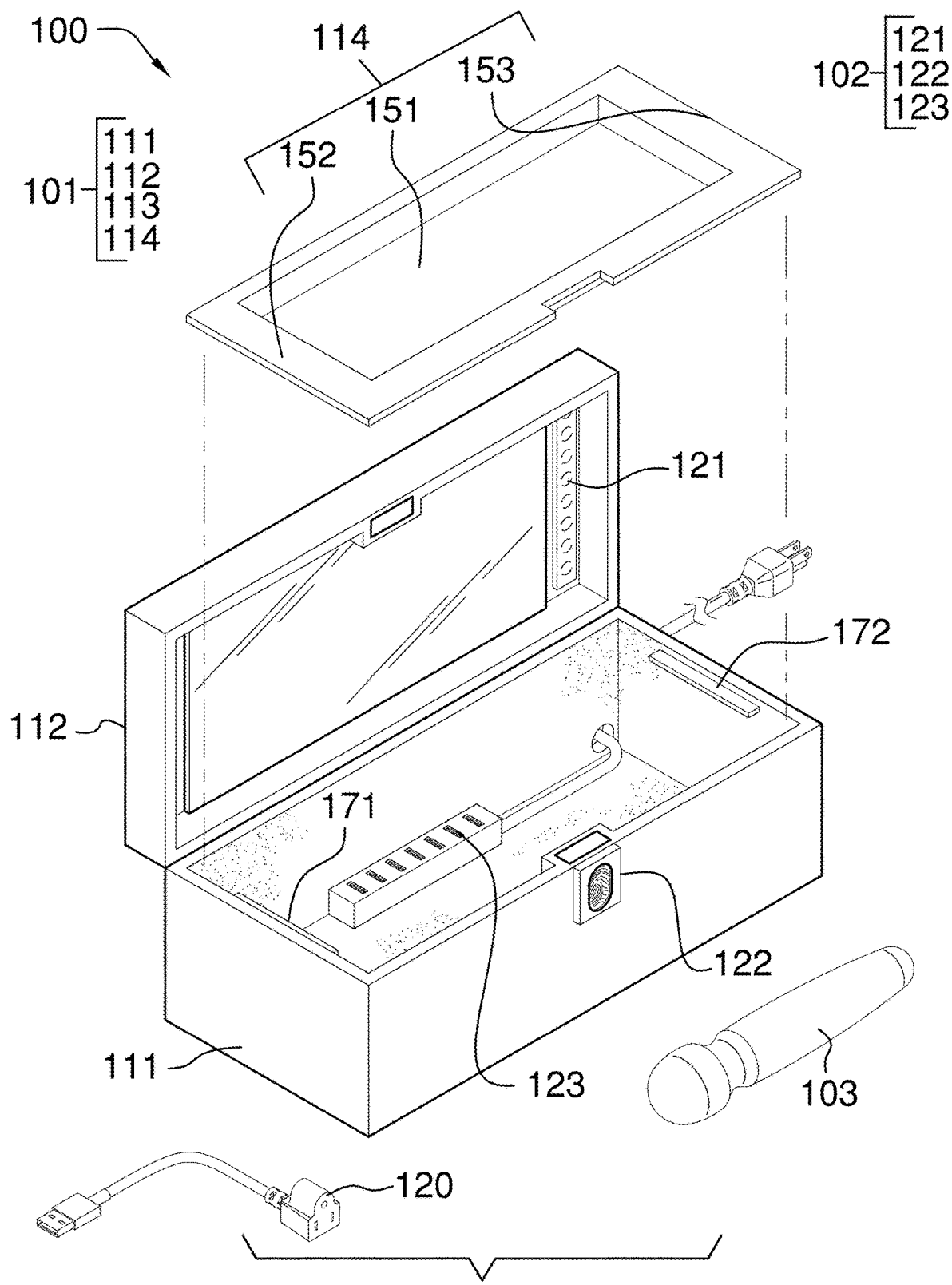
FIG. 2 is an exploded view of an embodiment of the disclosure.
Figure 3:
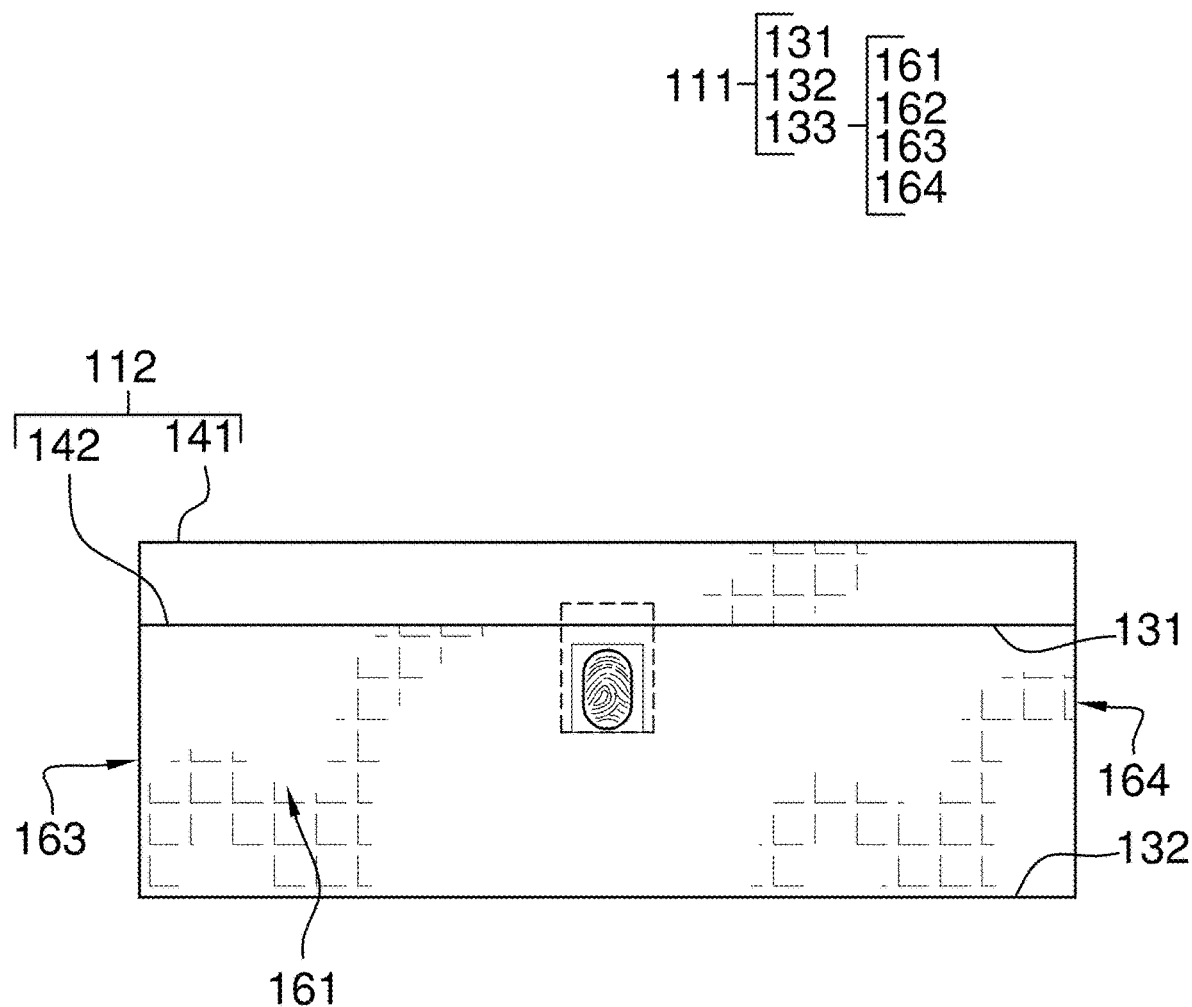
FIG. 3 is an anterior view of an embodiment of the disclosure.
Figure 4:
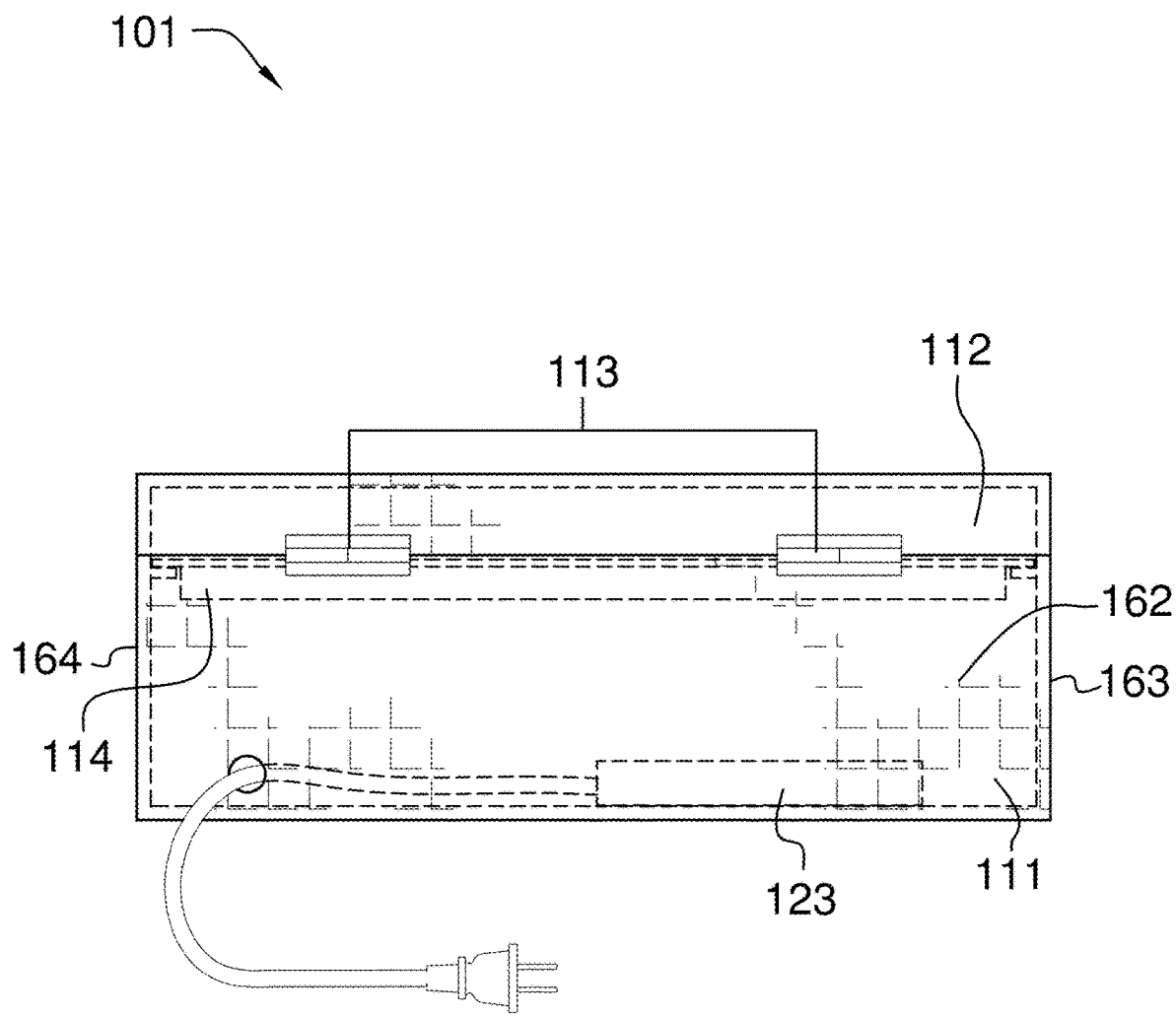
FIG. 4 is a posterior view of an embodiment of the disclosure.
Figure 5:
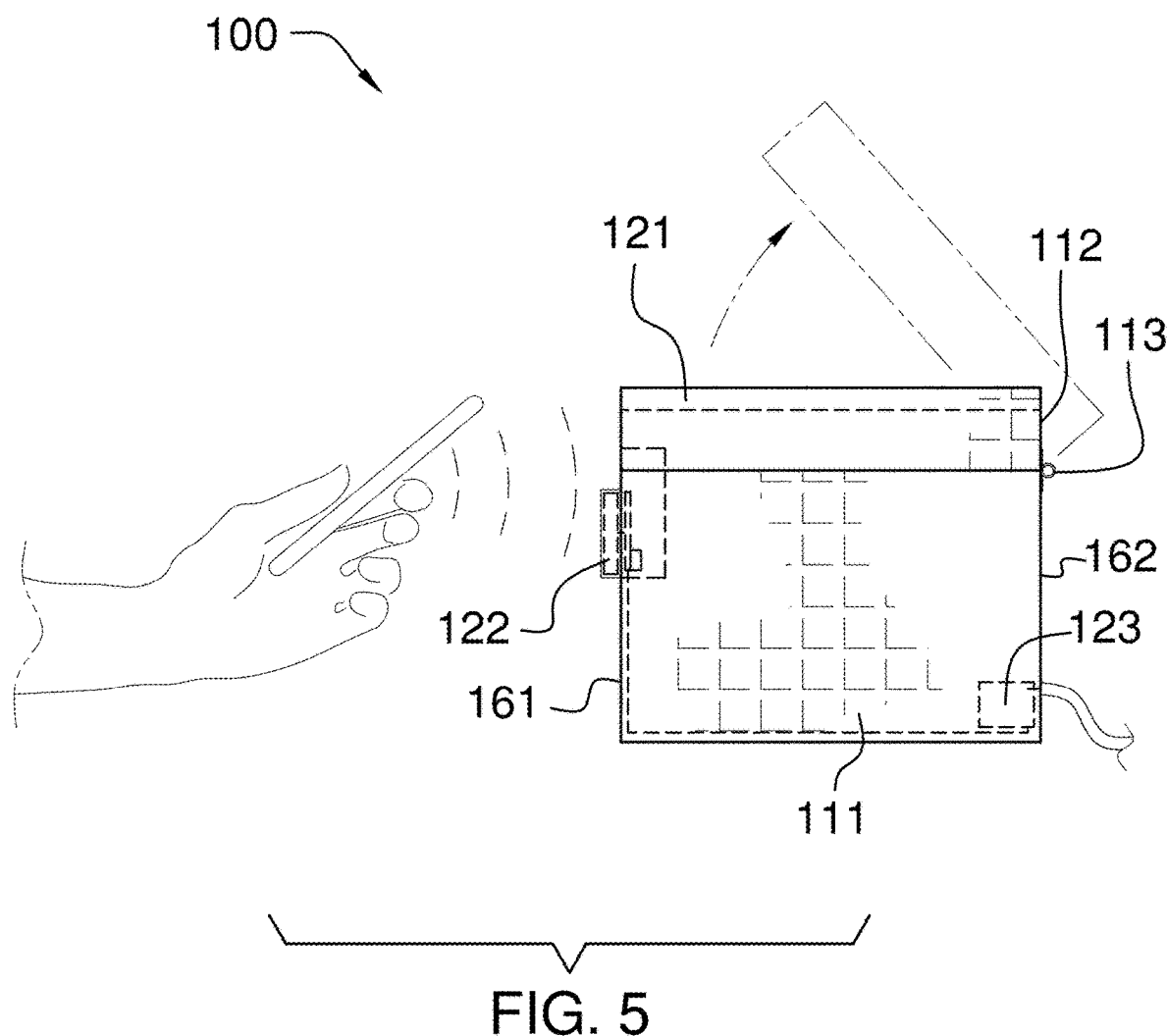
FIG. 5 is a lateral view of an embodiment of the disclosure.

Detailed reference will now be made to one or more potential embodiments of the disclosure, which are illustrated in FIGS. 1 through 5.

The container for charging electronic devices 100 (hereinafter invention) is a storage device. The invention 100 is configured for use with one or more personal tools 103. The invention 100 forms a protected space that contains the one or more personal tools 103. The invention 100 comprises a containment structure 101 and a control circuit 102. The control circuit 102 attaches to the containment structure 101. The containment space forms the protected space. The control circuit 102 is an electric circuit. The control circuit 102 illuminates the protected space. The control circuit 102 further provides a locking structure that locks the containment structure 101 in a closed position. The control circuit 102 further provides a source of electric energy used for recharging the batteries of the one or more personal tools 103 while the one or more personal tools 103 are stored in the protected space.

The one or more personal tools 103 are battery operated appliances that are stored in the protected space of the containment structure 101. The control circuit 102 provides any selected personal tool with electric energy that recharges the 11 battery of the selected personal tool.

The containment structure 101 is a prism shaped structure. The containment structure 101 is a rigid structure. The containment structure 101 is a hollow structure. The containment structure 101 has a pan shape. The containment structure 101 rotates between a closed position and an open position. The containment structure 101 forms the protected space that contains the one or more personal tools 103. The containment structure 101 comprises a protective pan structure 111, a lid pan structure 112, a hinge structure 113, and a tray structure 114.

The protective pan structure 111 is a prism shaped structure. The protective pan structure 111 is a rigid structure. The protective pan structure 111 has a pan shape. The protective pan structure 111 forms the protected space that contains the one or more personal tools 103. The protective pan structure 111 comprises a protective pan open face 131, a protective pan closed face 132, and a plurality of protective pan lateral faces 133.

The protective pan open face 131 forms the open face of the pan shape of the protective pan structure 111. The protective pan open face 131 forms the face of the protective pan structure 111 that provides access into the protected space. The protective pan open face 131 forms the superior face of the protective pan structure 111.

The protective pan closed face 132 forms the closed face of the pan shape of the protective pan structure 111. The protective pan closed face 132 forms a horizontally oriented containment surface of the protected space. The protective pan 16 closed face 132 is the face of the protective pan structure 111 that is distal from the protective pan open face 131.

The plurality of protective pan lateral faces 133 form the lateral face structure of the pan shape of the protective pan structure 111. The plurality of protective pan lateral faces 133 form the vertically oriented containment surfaces of the protected space. The plurality of protective pan lateral faces 133 project perpendicularly away from the interior face of the protective pan closed face 132 towards the protective pan open face 131. The plurality of protective pan lateral faces 133 further comprises an anterior protective pan lateral face 161, a posterior protective pan lateral face 162, a right protective pan lateral face 163, and a left protective pan lateral face 164.

The anterior protective pan lateral face 161 is the lateral face selected from the plurality of protective pan lateral faces 133 with the greatest exterior surface area.

The posterior protective pan lateral face 162 is the lateral face selected from the plurality of protective pan lateral faces 133 that is distal from the anterior protective pan lateral face 161.

The right protective pan lateral face 163 is the lateral face selected from the plurality of protective pan lateral faces 133 with the least exterior surface area. The right protective pan lateral face 163 further comprises a right side supporting ledge 171. The right side supporting ledge 171 is a ledge that is formed on the interior face of the right protective pan lateral face 163. The right side supporting ledge 171 forms a horizontally oriented surface. The right side tray ledge 152 of the tray structure 114 rests on the horizontally oriented surface formed by the right side supporting ledge 171. The right side supporting ledge 171 transfers the received load of the right side tray ledge 152 to the right protective pan lateral face 163.

The left protective pan lateral face 164 is the lateral face selected from the plurality of protective pan lateral faces 133 that is distal from the right protective pan lateral face 163. The left protective pan lateral face 164 further comprises a left side supporting ledge 172. The left side supporting ledge 172 is a ledge that is formed on the interior face of the left protective pan lateral face 164. The left side supporting ledge 172 forms a horizontally oriented surface. The left side tray ledge 153 of the tray structure 114 rests on the horizontally oriented surface formed by the left side supporting ledge 172. The left side supporting ledge 172 transfers the received load of the left side tray ledge 153 to the left 14 protective pan lateral face 164.

The lid pan structure 112 is a disk shaped structure. The lid pan structure 112 is a rigid structure. The lid pan structure 112 has a pan shape. The congruent ends of the disk structure of the lid pan structure 112 are geometrically similar to the protective pan open face 131 of the protective pan structure 111. The hinge structure 113 attaches the lid pan structure 112 to the protective pan structure 111 such that the lid pan structure 112 rotates relative to the protective pan structure 111. The lid pan structure 112 rotates between the closed position and the open position. The lid pan structure 112 encloses the protected space and the protective pan open face 131 when the lid pan structure 112 rotates into the closed position. The lid pan structure 112 allows access to the protected space and the protective pan open face 131 when the lid pan structure 112 rotates into the open position.

The lid pan structure 112 comprises a lid pan open face 141 and a lid pan closed face 142. The lid pan open face 141 is the open face of the pan shape of the lid pan structure 112. The lid pan open face 141 is geometrically similar to the protective pan open face 131 of the protective pan structure 111. The lid pan open face 141 aligns with the protective pan open face 131 in the closed position. The lid pan open face 141 forms the inferior face of the lid pan structure 112 in the closed position. The lid pan closed face 142 is the closed face of the pan shape of the lid pan structure 112. The lid pan closed face 142 forms the superior surface of the invention 100 when the lid pan structure 112 is in the closed position. The lid pan closed face 142 is the face of the lid pan structure 112 that is distal from the lid pan open face 141.

The hinge structure 113 is a fastening device. The hinge structure 113 is a rotating device. The hinge structure 113 rotates the lid pan structure 112 between the closed position and the open position. The hinge structure 113 attaches the exterior lip of the posterior protective pan lateral face 162 of the protective pan structure 111 to the exterior lip of the lid pan open face 141 of the lid pan structure 112.

The tray structure 114 is a pan shaped structure. The tray structure 114 mounts within the protected space formed by the protective pan structure 111. The tray structure 114 forms an elevated storage space within the protective pan structure 111. The tray structure 114 rests on the right side supporting ledge 171 of the right protective pan lateral face 163 and the left side supporting ledge 172 of the left protective pan lateral face 164. The right side supporting ledge 171 and the left side supporting ledge 172 forms the load path that elevates the tray structure 114 above the protective pan closed face 132 of the protective pan structure 111. The tray structure 114 further 14 comprises a tray pan 151, a right side tray ledge 152, and a left side tray ledge 153.

The tray pan 151 is a disk shaped structure. The tray pan 151 is a rigid structure. The tray pan 151 is a load bearing structure. The tray pan 151 forms an elevated platform that is used to organize the one or more personal tools 103 contained within the protective pan structure 111.

The right side tray ledge 152 is an undercut ledge that attaches to the exterior lip of the open face of the pan 23 structure of the tray pan 151. The right side tray ledge 152 forms a horizontally oriented surface that projects away from the lateral face of the tray pan 151.

The left side tray ledge 153 is an undercut ledge that attaches to the exterior lip of the open face of the pan structure of the tray pan 151. The left side tray ledge 153 forms a horizontally oriented surface that projects away from the lateral face of the tray pan 151. The left side tray ledge 153 attaches to the lateral face of the tray pan 151 that is distal from the right side tray ledge 152.

The right side tray ledge 152 transfers a portion of the load of the tray pan 151 to the right protective pan lateral face 163. The left side tray ledge 153 transfers the balance of the load of the tray pan 151 to the left protective pan lateral face 164.

The control circuit 102 comprises a lamp circuit 121, a biometric lock structure 122, and a plurality of charging usb ports 123. The control circuit 102 draws electric energy from a national electric grid. The control circuit 102 forms an electric connection that distributes the drawn electric energy to the lamp circuit 121. The control circuit 102 forms an electric connection that distributes the drawn electric energy to the biometric lock structure 122. The control circuit 102 forms an electric connection that distributes the drawn electric energy to the plurality of charging usb ports 123.

The invention 100 may include an adaptor 120 that works with the plurality of charging usb ports 123 to provide power to an electrical device that has a plug for use with a standard electrical outlet.

The lamp circuit 121 mounts on the interior surface of the lid pan closed face 142 of the lid pan structure 112. The lamp circuit 121 generates a visible spectrum electromagnetic radiation that illuminates the protected space formed by the protective pan structure 111. In the first potential embodiment of the disclosure, the lamp circuit 121 is an LED rope.

The biometric lock structure 122 is a biometric device. The biometric lock structure 122 is an electric lock. A portion of the biometric lock structure 122 mounts on the exterior lip of the anterior protective pan lateral face 161 of the protective pan structure 111. The balance of the biometric lock structure 122 mounts on the lip of the lid pan open face 141 of the lid pan structure 112. The biometric lock structure 122 locks the lid pan structure 112 to the protective pan structure 111 in the closed position. The biometric lock structure 122 reads the fingerprint of an authorized user to release the lid pan structure 112 from the protective pan structure 111.

The plurality of charging usb ports 123 forms a bank of usb ports. The plurality of charging usb ports 123 are mounted on the interior surface of the protected space formed by the protective pan structure 111. The plurality of charging usb ports 123 draws alternating current electric energy from the national electric grid. The plurality of charging usb ports 123 converts the drawn alternating current electric energy into a regulated direct current voltage. The plurality of charging usb ports 123 provides each selected personal tool with an electric port that provides the selected personal tool with access to the voltage regulated direct current electric energy.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anterior: As used in this disclosure, anterior is a term that is used to refer to the front side or direction of a structure. When comparing two objects, the anterior object is the object that is closer to the front of the structure.

Barrier: As used in this disclosure, a barrier is a physical obstacle that forms a boundary between a first space and a second space. The barrier prevents the passage of an object between the first space and the second space.

Biometric Device: As used in this disclosure, a biometric device is a security device that identifies an individual through the use of a unique and measurable physiological characteristic of the individual. Typical unique and measurable physiological characteristic include, but are not limited to, fingerprints, DNA, or retina of the eye.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Closed Position: As used in this disclosure, a closed position refers to a movable barrier structure that is in an orientation that prevents access into a protected space. The closed position is often referred to as an object being "closed." Always use orientation.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Container: As used in this disclosure, a container is a structure that forms a protected space (or protection space) used to store and transport an object. The term containment structure is a synonym for container.

Correspond: As used in this disclosure, the term correspond is used as a comparison between two or more objects wherein one or more properties shared by the two or more objects match, agree, or align within acceptable manufacturing tolerances.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electronic Lock: As used in this disclosure, an electronic lock is an electromechanically operated lock that: 1) mechanically locks an object; and, 2) is secured and released using an electrical or electronically driven mechanism.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Hinge: As used in this disclosure, a hinge is a device that permits the turning, rotating, or pivoting of a first object relative to a second object. A hinge designed to be fixed into a set position after rotation is called a locking hinge. A spring loaded hinge is a hinge formed as an elastic structure. The elastic structure of the spring loaded hinge is deformed under a rotating force such that the elastic structure returns the spring loaded hinge back to its relaxed shape after the rotating force is removed from the spring loaded hinge.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Lamp: As used in this disclosure, a lamp is an electrical circuit that generates (typically visible spectrum) electromagnetic radiation.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior posterior axis. Lateral movement is often called sideways movement.

Lateral Disk Structure: As used in this disclosure, a lateral disk structure refers to the juxtaposition of a first lateral face of a first disk-shaped structure to a second lateral face of a second disk-shaped structure such that: a) the center axes of the first disk and the second disk are parallel; and, b) the congruent ends of the first disk are parallel to the congruent ends of the second disk. The span of the length of the center axes of the first disk and the second disk need not be equal. The form factor of the congruent ends of the first disk and the second disk need not be geometrically similar.

Lateral Prism Structure: As used in this disclosure, a lateral prism structure refers to the juxtaposition of a first lateral face of a first prism structure to a second lateral face of a second prism structure such that: a) the center axes of the first prism and the second prism are parallel; and, b) the congruent ends of the first prism are parallel to the congruent ends of the second prism. The span of the length of the center axes of the first prism and the second prism need not be equal. The form factor of the congruent ends of the first prism and the second prism need not be geometrically similar.

LED: As used in this disclosure, an LED is an acronym for a light emitting diode. A light emitting diode is a diode that is also a light source.

LED Rope: As used in this disclosure, an LED rope is a commercially available lighting device. The LED rope is uses LEDs to illuminate a space. The LED rope is a flexible cord structure. The illuminating LEDs are distributed along the span of the length of the cord. The LED rope mounts on a surface. The flexible nature of the LED rope allows the LED rope to bend around corners during installation. The LED rope draws power from the national electric grid. While there are minor technical differences, this definition is intended to include LED rope like products commonly marketed as LED strips.

Ledge: As used in this disclosure, a ledge is a horizontal surface that projects away from a vertical structure. A ledge that projects away from, or overhangs, the vertical structure in the manner of a cantilever is referred to as an undercut ledge.

Left and Right: As used in this disclosure, the terms left and right are directional references associated with an object. The object is further defined with an anterior surface and a posterior surface. The terms left and right are standardized naming conventions for the lateral directions of the object. The terms left and right use the human body for the initial definition of the orientation. Specifically, when a human body is viewed from posterior side towards the anterior side, the left side of the human body is the lateral side of the human body that contains the heart. The right side of the human body is the lateral side of the body that contains the bulk of the liver. The left and right sides of the human body remain unchanged by changes to the direction from which the human body is viewed. The left side of any object is the same side as the left side of the human body when the object is viewed from posterior side towards the anterior side. The right side of any object is the same side as the right side of the human body when the object is viewed from posterior side towards the anterior side. The left and right sides of the object remain unchanged by changes to the direction from which the object is viewed.

Lip: As used in this disclosure, a lip refers to the region of the lateral face of a pan or tube structure that abuts the perimeter of the open face of the pan or tube structure. By abutting the perimeter of the open face is meant that the lip forms a brink with the surface that forms the perimeter of the open face. The lip of the interior surface of the pan structure is called the interior lip. The lip of the exterior surface of the pan structure is called the exterior lip. The region of the lateral face of a pan structure that abuts the perimeter of the closed face of the pan structure is called the brink lip.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Lock: As used in this disclosure, a lock is a fastening device that is released through the use of a key, a numeric or alphanumeric combination, or a biometric identification protocol.

National Electric Grid: As used in this disclosure, the national electric grid is a synchronized and highly interconnected electrical network that distributes energy in the form of electric power from a plurality of generating stations to consumers of electricity. The national electric grid is a commercially available source of AC electrical power. The national electric grid is regulated by an appropriate authority. The national electric grid comprises one or more utilities that sell electrical power for use by an electrical load. The national electric grid invoices for electrical power based on the total energy consumed by the electrical load. The national electric grid measures the energy consumption of an electrical load with an electrical meter. The national electric grid provides power through electrical connections known as a hot lead and a neutral lead. Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Open Position: As used in this disclosure, an open position refers to a movable barrier structure that is in an orientation that allows passage through a port or an aperture. The open position is often referred to as an object being "open."

Orientation: As used in this disclosure, orientation refers to the positioning of a first object relative to: 1) a second object; or, 2) a fixed position, location, or direction.

Pan: As used in this disclosure, a pan is a hollow containment structure. The pan has a shape selected from the group consisting of: a) a prism; and, b) a truncated pyramid. The pan has a single open face. The open face of the pan is often, but not always, the superior face of the pan. The open face is a surface selected from the group consisting of: a) a congruent end of the prism structure that forms the pan; b) a lateral face of the prism structure that forms the pan, c) the base face of the truncated pyramid structure; and, d) the truncated face of the truncated pyramid structure. A semi-enclosed pan refers to a pan wherein the closed end of prism structure of the pan and/or a portion of the lateral face of the pan is also open.

Perimeter: As used in this disclosure, a perimeter is one or more curved or straight lines that bounds an enclosed area on a plane or surface. The perimeter of a circle is commonly referred to as a circumference.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Private: As used in this disclosure, the term private refers to the limitation of use of an object to one or more individuals. The term privacy refers to maintaining an object or individual in a location where the object or individual can be neither observed nor disturbed.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Rigid Structure: As used in this disclosure, a rigid structure is a solid structure formed from an inelastic material that resists changes in shape. A rigid structure will permanently deform as it fails under a force. See bimodal flexible structure.

Roughly: As used in this disclosure, roughly refers to a comparison between two objects. Roughly means that the difference between one or more parameters of the two compared objects are not significantly different.

Tray: As used in this disclosure, a tray is a disk-shaped pan structure that has that has a ledge that projects away from the exterior lip of the open face of the pan structure.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A container for charging electronic devices comprising a containment structure and a control circuit;
   wherein the control circuit attaches to the containment structure;
   wherein the containment structure forms a protected space;
   wherein the control circuit is an electric circuit;
   wherein the container for charging electronic devices is configured for use with one or more personal tools;
   wherein the one or more personal tools are battery operated appliances that are stored in the protected space of the containment structure;
   wherein the control circuit further provides a locking structure that locks the containment structure in a closed position;
   wherein the control circuit further provides a source of electric energy used for recharging the batteries of the one or more personal tools while the one or more personal tools are stored in the protected space;
   wherein the control circuit comprises a lamp circuit, a biometric lock structure, and a plurality of charging usb ports;
   wherein the containment structure comprises a protective pan structure, a lid pan structure, a hinge structure, and a tray structure;
   wherein the protective pan structure comprises a protective pan open face, a protective pan closed face, and a plurality of protective pan lateral faces;
   wherein the protective pan open face forms the open face of the pan shape of the protective pan structure;
   wherein the protective pan open face forms the face of the protective pan structure that provides access into the protected space.

2. The container for charging electronic devices according to claim 1
   wherein the container for charging electronic devices is a storage device;
   wherein the container for charging electronic devices forms the protected space that contains the one or more personal tools.

3. The container for charging electronic devices according to claim 2
   wherein the control circuit illuminates the protected space;
   wherein the control circuit provides any selected personal tool with electric energy that recharges the battery of the selected personal tool.

4. The container for charging electronic devices according to claim 3
   wherein the containment structure is a rigid structure;
   wherein the containment structure is a hollow structure;
   wherein the containment structure has a pan shape;
   wherein the containment structure rotates between the closed position and an open position;
   wherein the containment structure forms the protected space that contains the one or more personal tools.

5. The container for charging electronic devices according to claim 4
   wherein the control circuit draws electric energy from a national electric grid;
   wherein the control circuit forms an electric connection that distributes the drawn electric energy to the lamp circuit;

wherein the control circuit forms an electric connection that distributes the drawn electric energy to the biometric lock structure;

wherein the control circuit forms an electric connection that distributes the drawn electric energy to the plurality of charging usb ports.

6. The container for charging electronic devices according to claim 5 wherein the protective pan structure is a rigid structure;

wherein the protective pan structure has a pan shape;

wherein the protective pan structure forms the protected space that contains the one or more personal tools;

wherein the lid pan structure is a disk shaped structure;

wherein the lid pan structure is a rigid structure;

wherein the lid pan structure has a pan shape;

wherein the congruent ends of the disk structure of the lid pan structure are geometrically similar to the protective pan open face of the protective pan structure;

wherein the hinge structure attaches the lid pan structure to the protective pan structure such that the lid pan structure rotates relative to the protective pan structure;

wherein the lid pan structure rotates between the closed position and the open position;

wherein the lid pan structure encloses the protected space and the protective pan open face when the lid pan structure rotates into the closed position;

wherein the lid pan structure allows access to the protected space and the protective pan open face when the lid pan structure rotates into the open position;

wherein the hinge structure is a fastening device;

wherein the hinge structure is a rotating device;

wherein the hinge structure rotates the lid pan structure between the closed position and the open position;

wherein the hinge structure attaches the protective pan structure to the lid pan structure;

wherein the tray structure is a pan shaped structure;

wherein the tray structure mounts within the protected space formed by the protective pan structure;

wherein the tray structure forms an elevated storage space within the protective pan structure.

7. The container for charging electronic devices according to claim 6 wherein the protective pan open face forms the superior face of the protective pan structure;

wherein the protective pan closed face forms the closed face of the pan shape of the protective pan structure;

wherein the protective pan closed face forms a horizontally oriented containment surface of the protected space;

wherein the protective pan closed face is the face of the protective pan structure that is distal from the protective pan open face;

wherein the plurality of protective pan lateral faces form the lateral face structure of the pan shape of the protective pan structure;

wherein the plurality of protective pan lateral faces form the vertically oriented containment surfaces of the protected space;

wherein the plurality of protective pan lateral faces project perpendicularly away from the interior face of the protective pan closed face towards the protective pan open face;

wherein the plurality of protective pan lateral faces further comprises an anterior protective pan lateral face, a posterior protective pan lateral face, a right protective pan lateral face, and a left protective pan lateral face;

wherein the anterior protective pan lateral face is the lateral face selected from the plurality of protective pan lateral faces with the greatest exterior surface area;

wherein the posterior protective pan lateral face is the lateral face selected from the plurality of protective pan lateral faces that is distal from the anterior protective pan lateral face;

wherein the right protective pan lateral face is the lateral face selected from the plurality of protective pan lateral faces with the least exterior surface area;

wherein the right protective pan lateral face further comprises a right side supporting ledge;

wherein the right side supporting ledge is a ledge that is formed on the interior face of the right protective pan lateral face;

wherein the right side supporting ledge forms a horizontally oriented surface;

wherein the right side tray ledge of the tray structure rests on the horizontally oriented surface formed by the right side supporting ledge;

wherein the right side supporting ledge transfers the received load of the right side tray ledge to the right protective pan lateral face;

wherein the left protective pan lateral face is the lateral face selected from the plurality of protective pan lateral faces that is distal from the right protective pan lateral face;

wherein the left protective pan lateral face further comprises a left side supporting ledge;

wherein the left side supporting ledge is a ledge that is formed on the interior face of the left protective pan lateral face;

wherein the left side supporting ledge forms a horizontally oriented surface;

wherein the left side tray ledge of the tray structure rests on the horizontally oriented surface formed by the left side supporting ledge;

wherein the left side supporting ledge transfers the received load of the left side tray ledge to the left protective pan lateral face.

8. The container for charging electronic devices according to claim 7 wherein the lid pan structure comprises a lid pan open face and a lid pan closed face;

wherein the lid pan open face is the open face of the pan shape of the lid pan structure;

wherein the lid pan open face is geometrically similar to the protective pan open face of the protective pan structure;

wherein the lid pan open face aligns with the protective pan open face in the closed position;

wherein the lid pan open face forms the inferior face of the lid pan structure in the closed position;

wherein the lid pan closed face is the closed face of the pan shape of the lid pan structure;

wherein the lid pan closed face forms the superior surface of the container for charging electronic devices when the lid pan structure is in the closed position;

wherein the lid pan closed face is the face of the lid pan structure that is distal from the lid pan open face;

wherein the hinge structure attaches the exterior lip of the posterior protective pan lateral face of the protective pan structure to the exterior lip of the lid pan open face of the lid pan structure;

wherein the tray structure rests on the right side supporting ledge of the right protective pan lateral face and the left side supporting ledge of the left protective pan lateral face;

wherein the right side supporting ledge and the left side supporting ledge forms the load path that elevates the tray structure above the protective pan closed face of the protective pan structure.

9. The container for charging electronic devices according to claim 8 wherein the lamp circuit mounts on the interior surface of the lid pan closed face of the lid pan structure;

wherein the lamp circuit generates a visible spectrum electromagnetic radiation that illuminates the protected space formed by the protective pan structure.

10. The container for charging electronic devices according to claim 9 wherein the biometric lock structure is a biometric device;

wherein the biometric lock structure is an electric lock;

wherein a portion of the biometric lock structure mounts on the exterior lip of the anterior protective pan lateral face of the protective pan structure;

wherein the balance of the biometric lock structure mounts on the lip of the lid pan open face of the lid pan structure;

wherein the biometric lock structure locks the lid pan structure to the protective pan structure in the closed position;

wherein the biometric lock structure reads the fingerprint of an authorized user to release the lid pan structure from the protective pan structure.

11. The container for charging electronic devices according to claim 10 wherein the plurality of charging usb ports forms a bank of usb ports;

wherein the plurality of charging usb ports are mounted on the interior surface of the protected space formed by the protective pan structure;

wherein the plurality of charging usb ports draws alternating current electric energy from the national electric grid;

wherein the plurality of charging usb ports converts the drawn alternating current electric energy into a regulated direct current voltage;

wherein the plurality of charging usb ports provides each selected personal tool with an electric port that provides the selected personal tool with access to the voltage regulated direct current electric energy.

12. The container for charging electronic devices according to claim 11 wherein the tray structure further comprises a tray pan, a right side tray ledge, and a left side tray ledge;

wherein the tray pan is a disk shaped structure;

wherein the tray pan is a rigid structure;

wherein the tray pan is a load bearing structure;

wherein the tray pan forms an elevated platform that is used to organize the one or more personal tools contained within the protective pan structure;

wherein the right side tray ledge is an undercut ledge that attaches to the exterior lip of the open face of the pan structure of the tray pan;

wherein the right side tray ledge forms a horizontally oriented surface that projects away from the lateral face of the tray pan;

wherein the left side tray ledge is an undercut ledge that attaches to the exterior lip of the open face of the pan structure of the tray pan;

wherein the left side tray ledge forms a horizontally oriented surface that projects away from the lateral face of the tray pan;

wherein the left side tray ledge attaches to the lateral face of the tray pan that is distal from the right side tray ledge;

wherein the right side tray ledge transfers a portion of the load of the tray pan to the right protective pan lateral face;

wherein the left side tray ledge transfers the balance of the load of the tray pan to the left protective pan lateral face.

* * * * *